Patented June 8, 1943

2,321,240

UNITED STATES PATENT OFFICE 2,321,240

METHOD OF DISPERSING THERMOPLASTIC HYDROCARBONS

Rotheus B. Porter, Jr., Malden, Mass., assignor to Bennett Incorporated, Cambridge, Mass., a corporation of Massachusetts No Drawing. Application January 8, 1940, Serial No. 312,821

5 Claims. (Cl. 252—311.5)

This invention relates to the art of dispersing in water thermoplastic hydrocarbons of the nature of paraffin wax, asphalt, etc. It deals more especially with a thermoplastic hydrocarbon dispersion stabilized with soap of such character as comports with high stability of dispersion even at comparatively low soap content, with fluency of dispersion at comparatively high solids content, with high water-repellence in the residue resulting from drying or setting of the dispersion, and with various other qualities of importance to the manufacturer and user of the dispersion.

Montan wax has heretofore been used as the source of a soap stabilizer eminently satisfactory for aqueous dispersions of thermoplastic hydrocarbons. In such case, the montan wax is melted in admixture with the thermoplastic hydrocarbon to be dispersed and the mixture is intimately commingled with a hot aqueous solution of caustic soda or other alkali capable of saponifying the saponifiable content of the montan wax to form a soap stabilizer for the resulting dispersion of thermoplastic hydrocarbon in the continuous aqueous medium. Although it might offhand be reasoned that various partly or completely saponifiable materials could serve the purpose of montan wax in the preparation of aqueous dispersions of thermoplastic hydrocarbons, investigation shows the error of such reasoning. Such materials as stearic acid and other fatty acids are unsatisfactory for various reasons, among which is the tendency for their soaps, especially their sodium soaps, to impart a semi-solid consistency, reminiscent of butter, to concentrated dispersions at room temperature even when dispersions having a similar solids content but stabilized by montan wax soap are quite fluent at room temperature. Again, fatty acid soap stabilizers are distinctly inferior to montan wax soap stabilizer in that when a thermoplastic hydrocarbon dispersion stabilized by a fatty acid soap stabilizer is diluted with water, it breaks (i. e., the finely dispersed particles tend to agglomerate or cluster into comparatively coarse particles) much sooner or, in other words, at distinctly higher solids content than a montan-wax-soap-stabilized aqueous dispersion of similar thermoplastic hydrocarbon. It is evidently the case that, upon dilution of the dispersion with water, the fatty acid soap stabilizer hydrolyzes to a very considerable extent and loses its stabilizing potency much sooner than the montan wax soap. Even when a saponifiable material is chosen because its significant qualities, including especially saponification number, ostensibly represent a comparatively close approach to montan wax, the use of such material in lieu of montan wax in the preparation of aqueous dispersions of thermoplastic hydrocarbons does not prove satisfactory. For instance, beeswax has qualities, especially acid and saponification numbers, offhand leading one to suspect that it would make an excellent substitute for montan wax in the preparation of an aqueous dispersion of thermoplastic hydrocarbon. However, its use conduces to a comparatively unstable dispersion, namely, one which upon being diluted only moderately is broken in the sense that its dispersed particles agglomerate to a marked degree. For instance, the dilution of such a dispersion from about 50% solids content to about 25% or lower solids content is attended by undesirable and distinctly noticeable agglomeration of the dispersed particles.

The present invention involves the discovery that candelilla wax, despite its superficial appearance of being less satisfactory as a source of soap stabilizer for aqueous dispersions of thermoplastic hydrocarbons than such materials as beeswax, actually yields a surprisingly potent and advantageous soap stabilizer for aqueous dispersions of thermoplastic hydrocarbons. Like montan-wax-soap-stabilized dispersions of thermoplastic hydrocarbons, thermoplastic hydrocarbon dispersions stabilized by candelilla wax soap are of high stability and of the desired fluency. They yield, upon drying or setting, residues of even greater water-repellence than those realized from the montan-wax-soap-stabilized dispersions. This latter advantageous quality is likely traceable to the fact that a given amount of candelilla wax consumes only about one-half as much caustic soda or equivalent alkali as a similar amount of montan wax, wherefore, in arriving at a dispersion, such as an aqueous wax dispersion, of given stability, whereas a 0.5% aqueous solution of caustic soda might be used when montan wax serves as the source of soap stabilizer, an aqueous caustic soda solution of only 0.25% strength need be used when a similar amount of candelilla wax serves under otherwise similar conditions as the source of soap stabilizer. Aside from the saving in caustic soda thus made possible by the use of the candelilla wax as the source of soap stabilizer, the candelilla-wax-soap-stabilized dispersions of thermoplastic hydrocarbons are especially useful for waterproofing purposes, since they need have a comparatively low soap content for a given stability of dispersion. Because of such comparatively low soap content and because the candelilla wax soap is evidently of a complex kind exhibiting limited water-solubility when once dried or set, there is less tendency for water to promote a reversion or re-dispersion of the residues resulting from a drying or setting of candelilla-wax-soap-stabilized dispersions.

The findings of the present invention may be applied in the preparation of dispersions of paraffin wax, asphalt, and other thermoplastic hydrocarbons. A typical paraffin wax dispersion such as is useful for paper-sizing purpose may be prepared substantially as follows. About 85 parts of paraffin wax, for instance, the grade known as scale wax and having a melting point of about 124° to 126° F., may be melted with about 15 parts of candelilla wax and the mixture heated to about 220° to 230° F. An aqueous caustic potash solution of about 0.25% strength may be separately heated to about 170° to 180° F. The hot melted mixture and the hot aqueous caustic potash solution may be withdrawn continuously from supply batches or reservoirs and fed as streams in equal proportions by weight into a suitable mixing or dispersing machine, for instance, a dispersing machine of the type disclosed in United States Patent No. 1,792,067, which latter machine comprises an inclined tubular mixing and dispersing shell into whose upper end portion the two streams may be fed at controlled rates and into whose intermediate portion a stream of diluting water may be fed, if desired, at a rate to ensure the emergence of a stream of finished dispersion of the desired solids content and fluency from the lower end of the shell. At the zone of confluence of the two streams at the upper end portion of the shell, the streams are vigorously agitated to form a single stream of dispersion which is vigorously agitated in the course of its flow down through the shell, including the intermediate zone of the shell at which the stream of dispersion may receive, if desired, a suitable amount of diluting water. In the instant example, however, it is preferred to avoid chilling of the materials and/or the resulting dispersion as they pass down through the mixing shell, wherein they remain for only a matter of seconds, say, about 6 to 10 seconds. The resulting dispersion, which is thus of about 50% solids content, issues from the lower end of the mixing shell in hot condition, say, at about 180 F.; and it may be delivered while hot into barrels and other containers for shipment. After cooling, the dispersion is of free-flowing quality, being comparable in its consistency to light cream, and can be diluted to 2% solids content with substantailly no flocculation of the dispersed solids.

Another example of procedure involving the preparation of an aqueous dispersion of asphalt may be generally similar to the foregoing example, excepting that much less candelilla wax is necessary for furnishing the soap stabilizer of the resulting dispersion. Thus, only about 5 parts of candelilla wax may be melted together with about 95 parts of petroleum asphalt having a melting point of, say, about 140° F., and the melted mixture heated to about 240° to 250° F. before it is commingled in a dispersing machine of the character described with 0.25% strength caustic potash solution preheated to, say, about 180° F. and fed into the machine at such volume, relative to the melted mixture, as to yield a dispersion of about 50% solids content. The resulting dispersion is of the desired free-flowing quality at room temperature.

It is possible to depart from the foregoing examples in various respects, including the particular proportion of candelilla wax relative to the thermoplastic hydrocarbon and the particular amount and strength of caustic alkali solution. In any event, however, one need use only a distinctly minor proportion of candelilla wax relative to the thermoplastic hydrocarbon being dispersed; and it is possible and economically desirable to produce paraffin wax dispersions of the desired high solids concentration and dilution-stability with a candelilla wax usage, based on the paraffin wax-candelilla wax mixture, not exceeding about 25%. Other hydrocarbon waxes, such as amorphous wax, having a melting point of about 145° to 155° F., may be used in lieu of paraffin wax in preparing aqueous wax dispersions intended for use as paper-sizing compositions, for which purpose they may be satisfactorily diluted prior to incorporation into the papermaking stock in the beater engine or on its way to the papermaking machine or be used for the sizing of the prefabricated paper sheet by so-called tub-sizing or calender-sizing methods. In such latter methods, the wax dispersions need not, as in the case of the beater-sizing of papermaking stock, be set or precipitated with alum and yet yield paper products of comparatively high water-repellence and dielectric quality, for such dispersions contain a relatively small amount of soap having lower water-solubility, especially after drying, than the stearates or other fatty acid soaps.

The aqueous wax dispersions hereof are of particular value in producing sized asbestos papers or boards such as are intended for insulating walls, pipes, etc. When the dispersions are incorporated into the asbestos fiber stock to be formed into such papers or boards, no alum or the like is necessary to fix or set the dispersed wax particles on the asbestos fiber, which itself is evidently impressed with an electrical charge opposite to that of the dispersed wax particles and hence evidently attracts and retains such particles thereon.

The aqueous asphalt dispersions hereof are also useful in much the same way as the wax dispersions, especially in heavy wrapping papers, paper boards, and other paper products wherein dark color is of no moment. The aqueous asphalt dispersions may also be used advantageously for road-binding purpose, in which case, once the dispersed asphalt has been set or dried, it does not tend to revert to emulsified form. The asphalt emulsions hereof are stable at high solids content and are of high dilution-stability despite the fact that they may be stabilized by an amount of soap generated from much less than about 25% candelilla wax, based on the weight of the asphalt-candelilla wax mixture, for instance, no more than about 5% of the weight of the mixture. Such stability of dispersion is evidently attributable to the stability of the soaps generated from certain constituents of the candelilla wax, which soaps evidently have much less tendency to hydrolyze in water at a particular dilution than the fatty acid soaps, such as the stearates.

It is to be understood that the aqueous dispersions hereof may be prepared at various dispersed solids content; that caustic soda or other saponifying agent may be used in lieu of caustic potash; and that aqueous solutions containing the saponifying agent in various concentrations may be commingled with the melted mixture of thermoplastic hydrocarbon and candelilla wax in preparing the dispersions hereof. When the dispersions are prepared accordant with the examples hereinbefore given, they are definitely alkaline and stable; and there is generally no particular advantage and some disadvantage in greatly exceeding the alkalinity of saponifying solution hereinbefore prescribed for producing such dispersions at the particular solids content indicated. The dispersions may, however, be prepared by a batch method, according to which the ingredients are mixed together in a mixing tank equipped with a high-speed mixer, such as a "Lightning" mixer. Thus, a mixture of candelilla wax and paraffin wax or asphalt in the proportions hereinbefore indicated may be melted as a batch, whereupon a preheated aqueous solution of caustic potash or its equivalent may be progressively added to the melted batch in the amount calculated to yield a dispersion of the desired solids content as the various materials in the mixing tank are being vigorously mixed or agitated in the tank. Such a batch method is, however, apt to lead to a dispersion whose dispersed particles are coarser than those of the dispersions prepared by the continuous method hereinbefore described.

While it has been indicated that the aqueous dispersions hereof are prepared at as high a solids content as is consistent with their free fluency at room temperature, for instance, a solids concentration of about 50%, it is, of course, possible to prepare such dispersions at lower concentration, for instance, a solids content of about 35% to 40%. Because of economies in shipment, however, the dispersions hereof are preferably prepared at about 50% dispersed solids content. The expression "dispersed solids content" as used herein means solids calculated as thermoplastic hydrocarbon and as candelilla wax. In other words, the relatively very small amount of caustic soda consumed in saponifying the saponifiable constituents of the candelilla wax may be disregarded in considering the dispersed solids content of the dispersions hereof, which may have a solids content ranging from about 35% to 50%.

Because of the complexity of the reaction product or stabilizer formed as a result of the reaction between a saponifying agent, such as caustic potash and caustic soda, and the soap-forming constituents of candelilla wax, such reaction product will for the sake of simplicity be designated in the appended claims by the expression "candelilla wax soap" or "saponified candelilla wax"; and such quoted expression shall be taken as meaning that the saponifiable constituents of the candelilla wax have been substantially completely saponified or reacted with caustic potash, caustic soda, or equivalent alkali.

I claim:
1. An aqueous dispersion of paraffin wax in a continuous aqueous medium containing candelilla wax soap as the dispersion-stabilizer, the solids content of said dispersion ranging from about 40% to 50% and the weight of the candelilla wax component of said soap amounting to no more than 25% of the weight of both the paraffin wax and the candelilla wax, said dispersion being of free-flowing quality of room temperature.

2. An aqueous dispersion of asphalt in a continuous aqueous medium containing candelilla wax soap as the dispersion-stabilizer, the solids content of said dispersion ranging from about 40% to 50% and the weight of the candelilla wax content of said soap amounting to no more than 5% of the weight of both the asphalt and the candelilla wax, said dispersion being of free-flowing quality at room temperature.

3. A method of dispersing a thermoplastic hydrocarbon in water, which comprises melting said hydrocarbon in admixture with candelilla wax in amount not exceeding about 25% by weight of the melted mixture; and commingling with the melted mixture a hot aqueous solution of caustic alkali to effect a dispersion of said hydrocarbon in the resulting aqueous medium as a continuous phase containing saponified candelilla wax as the dispersion-stabilizer; said stabilizer being much less hydrolyzed upon dilution with water than stearate soap.

4. A method of dispersing a thermoplastic hydrocarbon in water, which comprises melting said hydrocarbon in admixture with candelilla wax in amount not exceeding about 25% by weight of the melted mixture; and commingling with the melted mixture a hot aqueous solution of caustic potash to effect a dispersion of said hydrocarbon in the resulting aqueous medium as a continuous phase containing the potassium soap of candelilla wax as the dispersion-stabilizer, said solution being used in amount calculated to yield a dispersion whose solids content ranges from about 40% to 50% and which is of free-flowing quality at room temperature.

5. An aqueous dispersion of a thermoplastic hydrocarbon in a continuous aqueous medium containing candelilla wax soap as the dispersion-stabilizer, the solids content of said dispersion ranging from about 50% to about 2% and the weight of the candelilla wax component of said soap amounting to no more than 25% of the weight of both the thermoplastic hydrocarbon and the candelilla wax, said dispersion being characterized by free-flowing qualities at room temperature at its higher range of solids content and also by a substantial absence of flocculation of the dispersed solids at low solids content.

ROTHEUS B. PORTER, Jr.